(12) United States Patent
Hironaka et al.

(10) Patent No.: US 11,416,157 B2
(45) Date of Patent: Aug. 16, 2022

(54) STORAGE DEVICE AND DATA MIGRATION METHOD

(71) Applicant: HITACHI, LTD., Tokyo (JP)

(72) Inventors: Kazuei Hironaka, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/163,624

(22) Filed: Feb. 1, 2021

(65) Prior Publication Data
US 2021/0389898 A1 Dec. 16, 2021

(30) Foreign Application Priority Data

Jun. 11, 2020 (JP) .............................. JP2020-101524

(51) Int. Cl.
*G06F 3/06* (2006.01)

(52) U.S. Cl.
CPC .......... *G06F 3/0647* (2013.01); *G06F 3/0607* (2013.01); *G06F 3/0641* (2013.01); *G06F 3/0644* (2013.01); *G06F 3/0665* (2013.01); *G06F 3/0674* (2013.01)

(58) Field of Classification Search
CPC .... G06F 3/0607; G06F 3/0641; G06F 3/0644; G06F 3/0647; G06F 3/0665; G06F 3/0674
See application file for complete search history.

(56) References Cited

U.S. PATENT DOCUMENTS

2006/0095700 A1* 5/2006 Sato ........................ G06F 3/065
711/165

OTHER PUBLICATIONS https://aws.amazon.com/snowball/ User's Guide.

\* cited by examiner

*Primary Examiner* — Yong J Choe
(74) *Attorney, Agent, or Firm* — Volpe Koenig

(57) ABSTRACT

A storage device is connected to a migration source storage device that stores migration target data via a data line. A transportable external mass storage device that stores the migration target data migrated from the migration source storage device is connected to the storage device. The storage device references logical configuration information received from the migration source storage device via the data line and restores and stores the migration target data stored in the external mass storage device.

13 Claims, 12 Drawing Sheets

FIG. 4

LDEV MANAGEMENT TABLE
4100

| LDEV NUMBER (4101) | LDEV CAPACITY (4102) | VOL TYPE (4103) | DATA COMPRESSION (4105) | DEDUPLICATION (4106) | POOL NUMBER (4104) | PG NUMBER (4107) | DATA MIGRATION TARGET (4108) |
|---|---|---|---|---|---|---|---|
| 1 | 1TB | EVOL | INVALID | INVALID | 1 | N/A | APPLICABLE |
| 2 | 2TB | TPVOL | VALID | INVALID | 1 | N/A | NOT APPLICABLE |
| 3 | 320GB | SVOL | VALID | VALID | 1 | N/A | APPLICABLE |
| 4 | 32TB | RVOL | INVALID | INVALID | N/A | 2 | APPLICABLE |
| ... | ... | ... | ... | ... | ... | ... | |

FIG. 5

POOL MANAGEMENT TABLE
4200

| POOL NUMBER (4104) | POOL CAPACITY (4201) | POOL ALLOCATION CAPACITY (4202) | POOL USAGE CAPACITY (4203) | POOL VOL INFORMATION (4204) |
|---|---|---|---|---|
| 1 | 10TB | 4TB | 1TB | {1} |
| 2 | 20TB | 4TB | 2.2TB | {2, 3} |
| 3 | 30TB | 10TB | 8TB | {4, 5, 6} |
| ... | ... | ... | ... | |

FIG. 8

CHUNK MANAGEMENT TABLE
4700

| HASH VALUE | LDEV NUMBER | LBA | DATA LENGTH |
|---|---|---|---|
| 9b90064097ee329 | 1 | 0x00000000 | 8192 |
| 0b73dde4c72f1d4 | 1 | 0x00002000 | 8192 |
| 291c01ffdd09df12 | 2 | 0x00008000 | 8192 |
| 0fc82661664271d | 2 | 0x00022000 | 8192 |
| ... | ... | ... | ... |

LDEV CONFIGURATION INFORMATION
3101

LDEV LIST 4703

| LDEV NUMBER 4101 | LDEV CAPACITY 4102 | VOL TYPE 4103 | DATA COMPRES-SION 4105 | DEDUPLI-CATION 4106 | SNAP-SHOT 4705 |
|---|---|---|---|---|---|
| 1 | 2TB | TPVOL | VALID | INVALID | VALID |
| 2 | 2TB | TPVOL | VALID | INVALID | INVALID |
| 3 | 320GB | SVOL | VALID | VALID | VALID |
| 4 | 32TB | RVOL | INVALID | INVALID | INVALID |
| ... | ... | ... | ... | ... | ... |

LDEV CONFIGURATION INFORMATION SUB-TABLE 4704

| LBA 4611 | REFERENCES | | CHUNK LENGTH 4614 | HASH VALUE 4701 |
|---|---|---|---|---|
| | LDEV NUMBER 4612 | LBA 4613 | | |
| 0x00000000 | 1 | 0x00000000 | 8192 | 9b90064097ee329 |
| 0x00002000 | 1 | 0x00002000 | 8192 | 0b73dde4c72f1d4 |
| 0x00004000 | 1 | 0x00004000 | 8192 | 291c01ffdd09df12 |
| 0x00006000 | 3 | 0x00022000 | 8192 | 0fc82661664271d |
| ... | ... | ... | ... | |

⋮

LDEV CONFIGURATION INFORMATION SUB-TABLE

STORAGE DEVICE AND DATA MIGRATION METHOD

BACKGROUND

The present invention relates to a storage device and a data migration method.

In recent years, amounts of data used in companies have explosively increased and data in amounts in a range of several hundred terabytes (TB) to several petabytes (PB) has been used in IT systems within companies. On the other hand, companies have high demands for reducing the operating cost of IT systems. In recent years, to reduce the operating cost of data centers, in-house dedicated IT systems are installed in data centers operated by external data center operating companies, instead of being operated in in-house data centers, and there is a growing trend of reducing the operating cost of IT systems by using collocation services for outsourcing operations of the systems or by using public clouds that enable the IT systems to be used in Infrastructure-as-a-Service (IaaS) type services.

With the migration of the operations of the IT systems from the in-house data centers to the external data centers or the like, existing data stored in existing storage devices installed in the in-house data centers needs to be migrated to the external data centers that are migration destinations.

For data migration between data centers, a method for migrating data by using a dedicated line that connects a migration source data center to a migration destination data center, or by transferring data using an Internet line, or the like is generally considered. However, each of the data lines currently mainly has a bandwidth of 1 Gbps or 10 Gbps due to problems with the cost, and higher-speed data lines with bandwidths of 40 Gbps and 100 Gbps are currently expensive and have not yet become widespread.

In addition, when it is assumed that data in a large amount, such as several hundred TB to several PB, is transferred using a dedicated line with a bandwidth of about 10 Gbs, it is considered that a time period required for the data transfer is one month or more. In addition, the data line that connects between the data centers is also normally shared by another system. For a data migration operation, a bandwidth limitation needs to be considered so as not to affect another system that is being operated.

As described above, in the case where a large amount of data is migrated between data centers via a data line, there are various problems with a time period for the migration and the efficiency of the migration. Therefore, a data migration technique that migrates a large amount of data and can reduce a time period for migration and improve the efficiency of the migration is requested.

As the data migration technique for migrating a large amount of data, data migration services that use a transportable large-capacity mass storage device are provided mainly to public cloud venders as data migration methods for migrating data between data centers installed in remote sites without using a data line. In each of these data migration services, a transportable mass storage device with a capacity of about 50 TB is leased to an end user, and the end user causes data to be stored in a mass storage device and sends the data to a public cloud vender. Therefore, the public cloud vender performs a task of acquiring the data, and the migration of the data is completed.

For example, Non-Patent Literature 1, https://aws.amazon.com/snowball/discloses, as a section that migrates a large amount of data between data centers installed in remote sites or the like, a large-data migration section that migrates a large amount of data using a transportable mass storage device.

According to Non-Patent Literature 1, the transportable mass storage device is connected to a storage device or a server device that is installed in a data center that is a data migration source, and data is copied to the mass storage device. The mass storage device is physically transported to a data center that is a data migration destination. The mass storage device is connected to a storage device or a server device that is a migration destination and is installed in the data center that is the data migration destination. By copying the data to the migration destination, the migration of the data in the large amount between the data centers installed in the remote sites is completed.

SUMMARY

The large-data migration section that is disclosed in Non-Patent Literature 1 and uses the mass storage device migrates only data. Therefore, after data migration, data cannot be restored in the migration destination in consideration of a volume configuration of the migration source storage device. Especially, in the migration source storage device, when a physical capacity required for the storage device is reduced by operating a data amount reduction function (deduplication, compression, or snapshot) specific to the storage device, data in an amount equal to or larger than a physical capacity of the migration source storage device needs to be migrated to the migration destination.

Therefore, it is considered that, in a use case in which data is to be migrated from an existing storage device installed in an in-house data center to a storage device installed in a data center that is a collocation destination, the migration destination needs to take over a volume configuration of the migration source storage device. Therefore, it is desirable that, in the data migration between the storage devices, the volume configuration of the migration source storage device be restored to the original volume configuration in the migration destination storage device.

An object of the present invention is to efficiently migrate a large amount of data between a migration source storage device and a migration destination storage device that are installed in different data centers, while maintaining a volume configuration of the migration source storage device.

According to an aspect of the present invention, a storage device is connected via a data line to a migration source storage device that stores migration target data. A transportable external mass storage device that stores the migration target data migrated from the migration source storage device is connected to the storage device. The storage device references logical configuration information received from the migration source storage device via the data line and restores and stores the migration target data stored in the external mass storage device.

According to another aspect of the present invention, in a data migration method for migrating migration target data stored in a first storage device installed in a migration source data center to a second storage device installed in a migration destination data center, the first storage device of the migration source data center is connected to the second storage device of the migration destination data center via a data line, a transportable external mass storage device is connected to the first storage device and stores the migration target data, logical configuration information relating to the migration target data is transmitted from the first storage device to the second storage device via the data line, the second storage device is connected to the external mass storage device storing the migration target data and references the logical configuration information received via the data line, and the migration target data stored in the external mass storage device is restored in the second storage device.

According to an aspect of the present invention, it is possible to efficiently migrate a large amount of data between a migration source storage device and a migration destination storage device that are installed in different data centers, while maintaining a volume configuration of the migration source storage device.

BRIEF DESCRIPTION OF THE DRAWINGS

FIG. 4 is a diagram illustrating an example of a configuration of an LDEV management table included in the management information stored in the storage device.

FIG. 5 is a diagram illustrating an example of a configuration of a pool management table included in the management information stored in the storage device.

FIG. 8 is a diagram illustrating an example of a configuration of a chunk management table included in the management information stored in the storage device.

FIG. 9 is a diagram illustrating an example of a configuration of LDEV configuration information.

DETAILED DESCRIPTION

Figure 1:
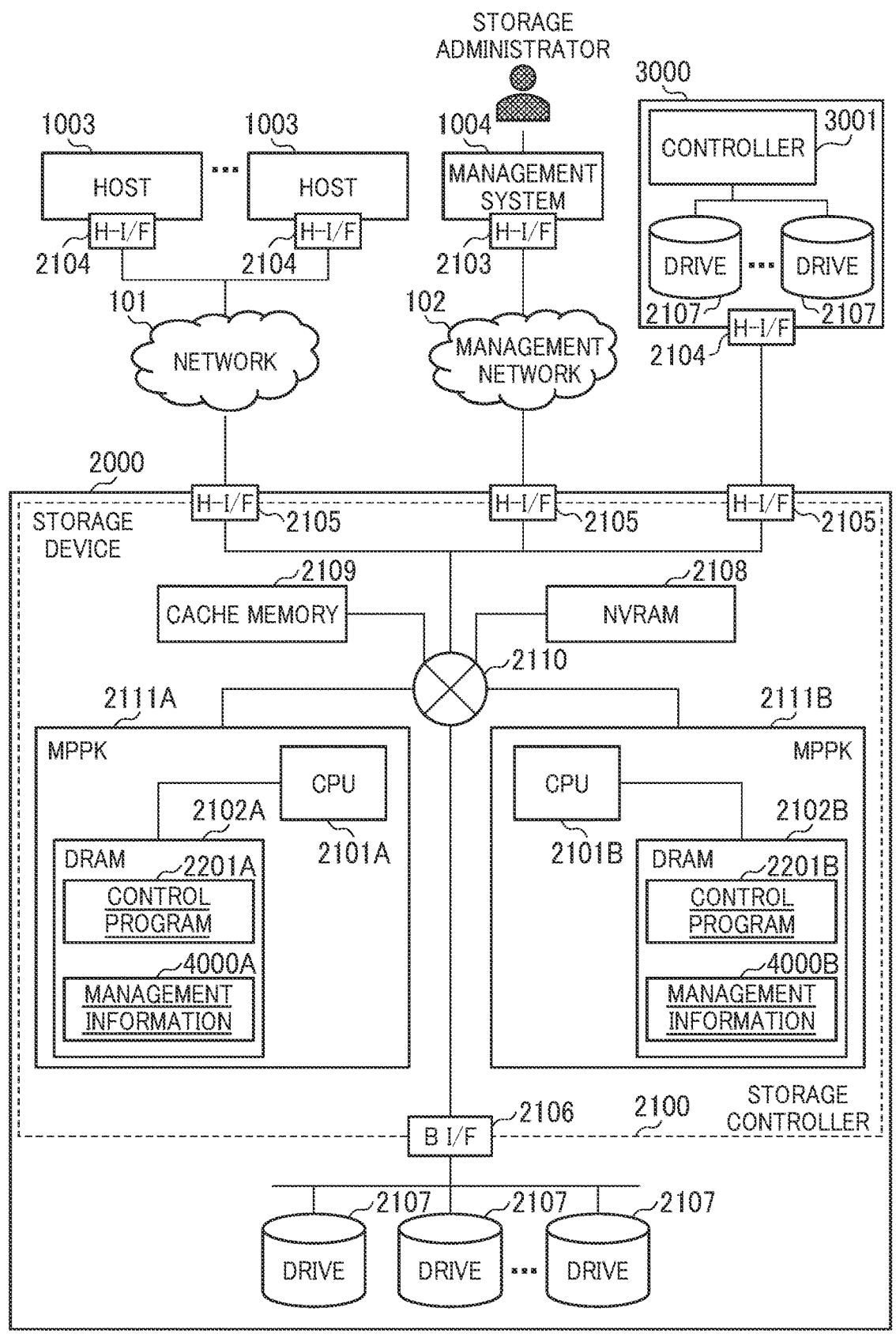
FIG. 1 is a diagram illustrating an example of a configuration of a storage device.

Hereinafter, an embodiment is described with reference to the drawings.

Embodiment

The following embodiment does not limit the present invention according to the claims, and not all combinations of elements described in the embodiment are essential to solving units of the present invention. Although the following describes various information using expressions "xxx tables", "xxx lists", "xxx DBs", "xxx queues", and the like in some cases the various information may be represented as data structures other than tables, lists, DBs, queues, and the like. Therefore, the "xxx tables", the "xxx lists", the "xxx DBs", the "xxx queues", and the like are referred to as "xxx information" in some cases in order for the information not to depend on data structures.

Although expressions "identification information", "identifiers", "names", "IDs", and the like are used to explain details of the various information in the following description, the expressions can be replaced with each other.

In the following description, the embodiment of the present invention that is described later may be implemented as software that is executed in a general-purpose computer, or may be implemented as dedicated hardware or a combination of software and hardware.

In the following description, processes are explained using "programs" as subjects, and the programs are executed by processors (for example, central processing units (CPUs)) and execute the defined processes using storage resources (for example, memories), communication I/Fs, and ports. Therefore, the processes may be explained using the processors as subjects.

In the following description, the processes that are explained using the programs as the subjects may be executed by computers (for example, computing hosts or storage devices) with processors. In the following description, a "controller" represents a processor or a hardware circuit that executes all or a part of processes to be executed by the processor. The programs may be installed in the computers from a program source (for example, a program distribution server or a computer-readable storage medium). In this case, the program distribution server includes a CPU and a storage resource, and the storage resource stores a distribution program and a distribution target program. The CPU of the program distribution server executes the distribution program, thereby distributing the distribution target program to the other computers.

In the following description, a "PDEV" represents a physical storage device and may be typically a nonvolatile storage device (for example, an auxiliary storage device). For example, the PDEV may be a hard disk drive (HDD) or a solid state drive (SSD). Different types of PDEVs may be included in a storage system.

In the following description, a "RAID" is an abbreviation for Redundant Array of Inexpensive Disks". A RAID group is composed of a plurality of PDEVs (typically, PDEVs of the same type) and stores data in accordance with a RAID level associated with the RAID group. The RAID group may be called a parity group (PG). The parity group may be, for example, a RAID group that stores a parity.

In the following description, a "VOL" is an abbreviation for volume and may be a physical storage device or a logical storage device. The VOL may be a real VOL (RVOL) or a virtual VOL (VVOL). The "RVOL" may be a VOL based on a physical storage resource (for example, one or more RAID groups) included in a storage system including the RVOL. The "VVOL" may be any of an externally connected VOL (EVOL), a capacity-expanded VOL (TPVOL), and a snapshot VOL. The EVOL is based on a storage space (for example, a VOL) of an external storage system and may be a VOL conforming to a storage virtualization technique. The TPVOL is composed of a plurality of virtual regions (virtual storage regions) and may be a VOL conforming to a capacity virtualization technique (typically, thin provisioning).

In the following description, a "pool" is a logical storage region (for example, a set of pool VOLs) and may be prepared for each usage purpose. For example, as the pool, at least one type of a TP pool and a snapshot pool may be used. The TP pool may be a storage region composed of a plurality of pages (real storage regions). When a page is not allocated to a virtual region (virtual region of the TPVOL) to which an address specified in a write request received from a host system (hereinafter referred to as host) belongs, a storage controller allocates a page to the virtual region (write destination virtual region) from the TP pool (the page may be newly allocated to the write destination virtual region even when a page is already allocated to the write destination virtual region). The storage controller may write, to the allocated page, write data associated with the write request. The snapshot pool may be a storage region in which data saved from an original VOL is stored. One pool may be used as the TP pool or the snapshot pool. A "pool VOL" may be a VOL serving as a constituent element of the pool. The pool VOL may be an RVOL or an EVOL.

In the following description, a VOL (VOL provided to the host) that is recognized from the host is referred to as "LDEV". In the following description, the LDEV is a TPVOL (or an RVOL), and a pool is a TP pool. However, the present invention is also applicable to a storage device for which a capacity expansion technique (thin provisioning) is not used.

In the following description, a "PVOL (primary VOL)" is an LDEV serving as an original volume for backup, replication, or snapshot, and an "SVOL (secondary VOL)" may be an LDEV serving as a backup destination, a replication destination, or a snapshot destination.

In the following description, an inline method is mainly used as a data deduplication method, but another type of a deduplication method, such as a post-process method or a combination of the inline method and the post-process method, may be used. The "inline method" is a method for processing data before writing of the data to a storage device (for example, an LDEV or a PDEV). The "post-process method" is a method for processing data in asynchronization after writing of the data to the storage device.

In the following description, the inline method is mainly used as a data compression method, but another type of a data compression method, such as the post-process method or a combination of the inline method and the post-process method, may be used. As a data compression algorithm, any of reversible data compression algorithms, such as GZIP, LZO, and LZ4, or a combination of the reversible data compression algorithms may be used.

In the following description, data is deduplicated in units of data chunks. The data chunks are hereinafter merely referred to as "chunks" in some cases. In the embodiment, each of the chunks may have a variable length or a fixed length.

FIG. 1 illustrates an example of a configuration of a storage device according to the embodiment.

A host 1003 is connected to a storage device 2000 via a network 101. A management system 1004 is connected to the storage device 2000. The network 101 is, for example, a fiber channel (FC) or an Internet Small Computer System Interface (iSCSI).

The host 1003 is an abbreviation for host system and may be one or more hosts. The host 1003 includes a host interface device (H-I/F) 2104. The host 1003 transmits an access request (write request or read request) to the storage device 2000 via the H-I/F 2104 and receives a response (for example, a write response including write completion or a read response including a read chunk) to the access request via the H-I/F 2104. The H-I/F 2104 is, for example, a host bus adapter (HBA) or a network interface card (NIC).

The management system 1004 manages the configuration and state of the storage device 2000. The management system 1004 includes a management interface device (M-I/F) 2103. The management system 1004 transmits an instruction to the storage device 2000 via the M-I/F 2103 and receives a response to the instruction via the M-I/F 2103. The M-I/F 2103 is, for example, an NIC.

The management system 1004 may be software that is executed in a server or a PC that manages the storage device 2000. Alternatively, the management system 1004 may be implemented as a security appliance or a software function that manages the host 1003 connected to the storage device 2000.

The external mass storage device 3000 is installed outside the storage device 2000 and includes a controller 3001, a plurality of drives 2107, and a host interface 2104. The controller 3001 controls the external mass storage device 3000. The host interface 2104 is connected to the storage device 2000. Since the external mass storage device 3000 is connected to the storage device 2000, the external mass storage device 3000 is used to migrate data. The external mass storage device 3000 may be implemented using the same members as those of the storage device 2000 in the same manner as the storage device 2000 or may be implemented in a simpler form, compared to the case where the external mass storage device 3000 includes the foregoing constituent components.

A storage controller 2100 includes a front-end interface device (F-I/F) 2105, a back-end interface device (B-I/F) 2106, a cache memory (CM) 2109, a nonvolatile RAM (NVRAM) 2108, an MPPK 2111A, an MPPK 2111B, and a relay device 2110. The relay device 210 relays communication between the components. The relay device 2110 is, for example, a bus or a switch.

The F-I/F 2105 communicates with the host 1003 or a management server. The B-I/F 2106 communicates with the drives 2107. The B-I/F 2106 may include an E/D circuit (hardware circuit for encoding and decoding). For example, the B-I/F 2106 may include a serial attached SCSI (SAS) controller, and the SAS controller may include the E/D circuit.

In the CM 2109 (for example, a dynamic random-access memory (DRAM)), data to be written to the drives 2107 or data read from the drives 2107 is temporarily stored by the MPPKs 2111. In the NVRAM 2108, data within the CM 2109 (for example, dirty data (data not written in the drives 2107)) is saved by the MPPKs 2111 that have received power from a battery (not illustrated) at the time of power interruption.

The MPPK 2111A and the MPPK 2111B form a cluster. The MPPK 2111A (MPPK 2111B) includes a DRAM 2102A (2102B) and a CPU 2101A (CPU 2101B). In the DRAM 2102A (DRAM 2102B), a control program 2201A (control program 2201B) to be executed by the CPU 2101A (CPU 2101B) and management information 4000A (management information 4000B) to be referenced or updated by the CPU 2101A (CPU 2101B) are stored. For example, an I/O process of the storage device 2000 and an address conversion process are executed by causing the CPU 2101A (CPU 2101B) to execute the control program 2201A (control program 2201B). Either one or both of the control program 2201A (control program 2201B) and the management information 4000A (management information 4000B) may be stored in a storage region (for example, the CM 2109) that is shared by the plurality of MPPKs 2111A and 2111B.

The storage device 2000 includes the plurality of drives 2107 and the storage controller 2100 connected to the plurality of drives 2107. One or more RAID groups that include the plurality of drives 2107 may be configured.

Figure 2:
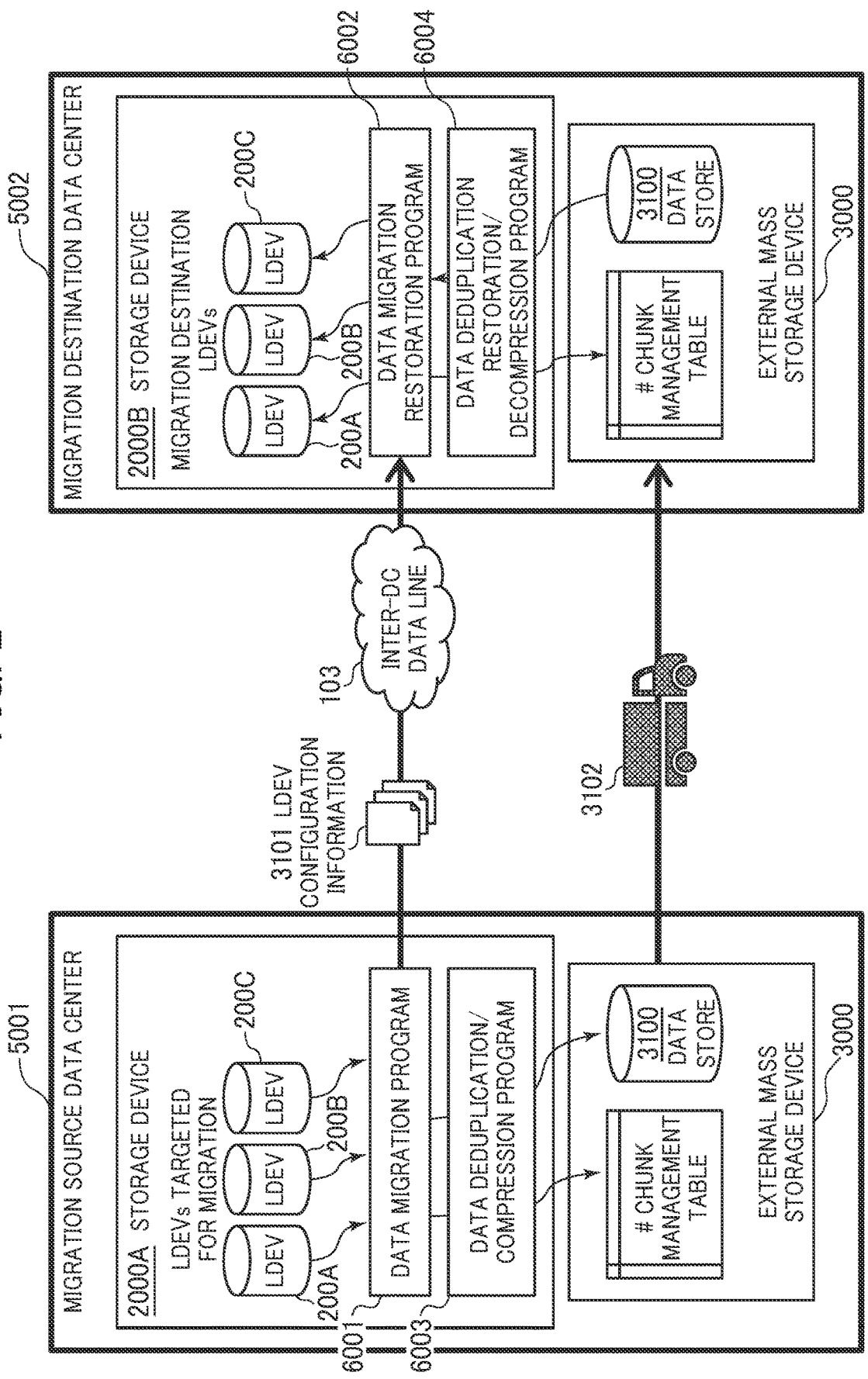
FIG. 2 is a diagram illustrating a method for migrating data between storage devices installed in different data centers.

Method for Migrating Data from Migration Source Storage to Migration Destination Storage FIG. 2 illustrates a method for migrating data between storage devices installed in different data centers. FIG. 2 illustrates an example in which data is migrated from a migration source storage device 2000A installed in a migration source data center 5001 to a migration destination storage device 2000B installed in a migration destination data center 5002.

In the storage device 2000A, a data migration program 6001 divides data within a logical volume LDEV 200A targeted for migration, a logical volume LDEV 200B targeted for migration, and a logical volume LDEV 200C targeted for migration into partial data streams (chunks) of a fixed size, and generates specific values (fingerprint values (FP values)) identifying the data for the respective chunks.

Next, a data compression/deduplication program 6003 identifies duplication of the chunks using the FP values that are the data specific values for the respective chunks. In this manner, the data compression/deduplication program 6003 identifies the duplication of the chunk data, selects only a chunk having unique data and an FP value for the chunk, compresses the chunk data, and causes the compressed chunk data to be stored in a data store 3100 within the external mass storage device 3000 and a chunk management table 4700.

Next, the external mass storage device 300 is transported by a physical transporting unit 3102 to the migration destination data center 5002. The physical transporting unit 3102 is, for example, a transporting unit that uses a moving machine, such as a car, a train, an airplane, or a ship, a transporting unit that uses human power by a person, a transporting unit that uses an animal, such as a horse, a cow, a camel, or a llama, or the like.

In the migration destination data center 5002, the data is migrated in the migration destination storage device 2000B. Therefore, the migration destination storage device 2000B executes a process of restoring a logical volume LDEV 200A targeted for the migration, a logical volume LDEV 200B targeted for the migration, and a logical volume LDEV 200C targeted for the migration.

To execute the foregoing restoration process, the transported external mass storage device 3000 is connected to the migration destination storage device 2000B. The migration source storage device 2000A and the migration destination storage device 2000B are connected to each other via an inter-DC data line 103 that connects the data centers to each other.

Next, the migration source storage device 2000A transmits LDEV configuration information 3101 of the logical volumes LDEVs 200A, 200B, and 200C targeted for the migration to the migration destination storage device 2000B via the inter-DC data line 103.

Specifically, the LDEV configuration information 3101 includes configuration information of the logical volumes LDEVs 200A, 200B, and 200C targeted for the migration. For example, the LDEV configuration information 3101 includes attribute information that relates to the logical volumes and indicates capacities of the logical volumes, types of the logical volumes, parent-child relationships between volume snapshots, and whether deduplication and compression are set, fingerprint information (FP values) indicating values identifying data streams belonging to the logical volumes, and the like.

The migration destination storage device 2000B receives the LDEV configuration information 3101. A data migration restoration program 6002 executes a process of restoring the migration destination logical volumes LDEVs 200A, 200B, and 200C based on the received LDEV configuration information 3101.

Specifically, in the restoration process, the data migration restoration program 6002 generates, as migration destination LDEVs 200, LDEVs having the same attribute information as the migration destination LDEVs 200 in the migration destination storage device 2000B based on the LDEV configuration information 3101 corresponding to the LDEVs 200 targeted for restoration. A data deduplication restoration/decompression program 6004 references the chunk management table 4700 within the external mass storage device 3000 based on the fingerprint information (FP values) indicating the values identifying the data streams belonging to the logical volumes included in the LDEV configuration information 3101, references the data store 3100 to identify the chunk data corresponding to the FP values, and copies the data to the migration destination LDEVs 200, thereby restoring the data to be restored for the LDEVs.

When the chunk data corresponding to the FP values is not present in the chunk management table 4700 or the data store 3100, the data migration restoration program 6002 uses the inter-DC data line 103 to provide, to the data migration program 6001 of the migration source storage device 2000A, a request to transmit the latest data streams of concerned data stream portions of the LDEVs 200 targeted for the migration. The data migration restoration program 6002 uses the inter-DC data line 103 to receive the data streams and reflects the received data streams in the concerned LDEVs. Therefore, the data can be migrated while the update of the data in the data migration operation reduces a difference between the data in the migration source storage device 2000A and the data in the migration destination storage device 2000B.

The data migration is completed as described above. Therefore, when a large amount of data needs to be migrated between the data centers located in remote regions, and an available bandwidth of the inter-DC data line 103 connecting the data centers to each other is limited, the data in the large amount can be migrated at a high speed, an effect on business associated with the data migration is minimized, and the efficiency of the data migration operation is improved.

Figure 3:
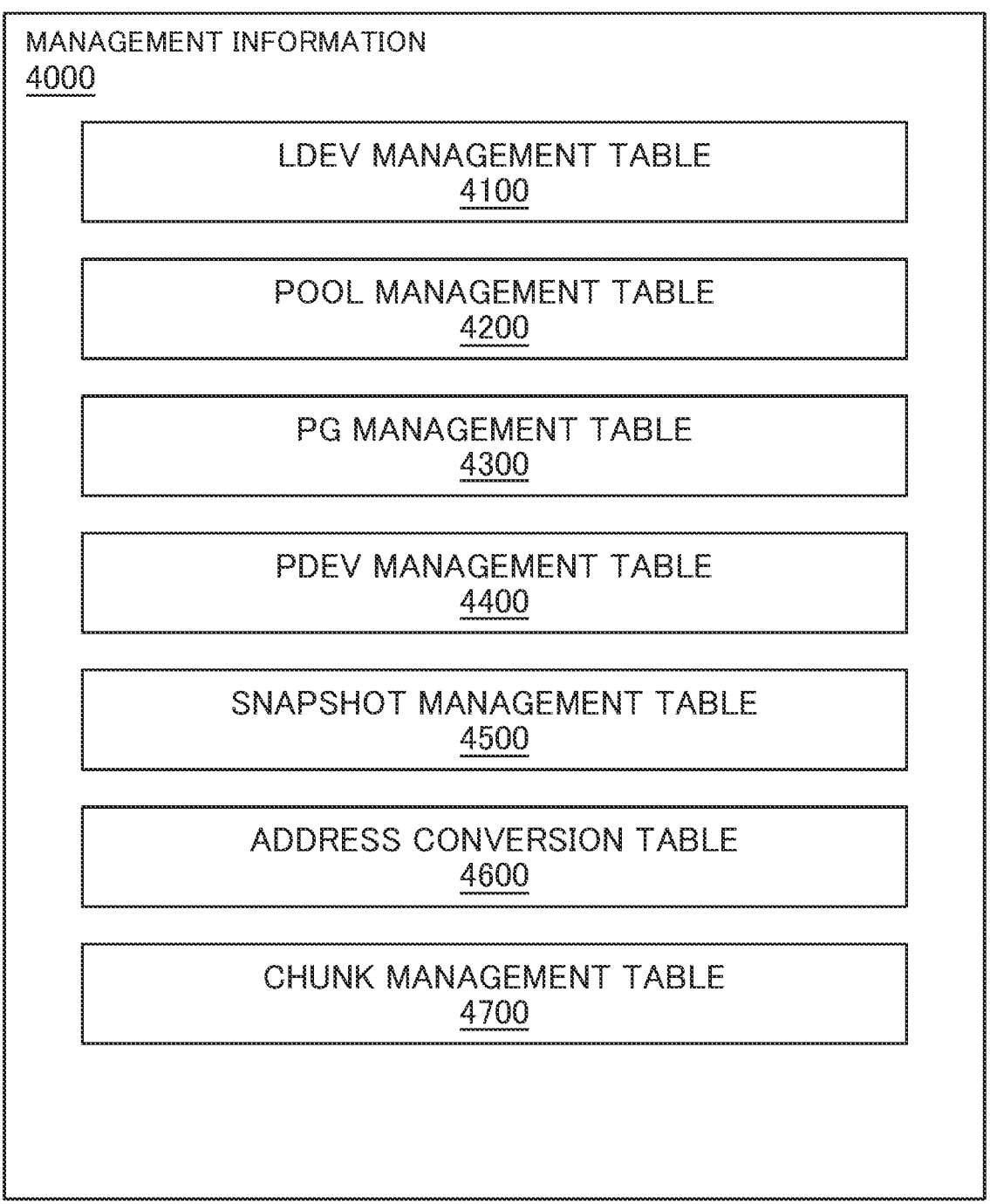
FIG. 3 is a diagram illustrating an example of a configuration of management information stored in the storage device.

FIG. 3 illustrates an example of a configuration of management information stored in the storage device according to the embodiment.

The management information 4000 includes a plurality of management tables. The management tables are, for example, an LDEV management table 4100, a pool management table 4200, a PG management table 4300, a PDEV management table 4400, a snapshot management table 4500, an address conversion table 4600, a chunk management table 4700, and the like. The LDEV management table 4100 holds information on the LDEVs 200. The pool management table 4200 holds information on pools that provide logical capacities to the LDEVs. The PG management table 4300 holds information to be used to manage parity groups (PGs) forming RAIDs, each of which is composed of a plurality of PDEVs. The PDEV management table 4400 holds information to be used to manage the physical drives 2107. The snapshot management table 4500 is used to manage snapshots for the LDEVs 200. The address conversion table 4600 holds association information of a chunk associated with a logical address of an LDEV 200 for which deduplication is set. The chunk management table 4700 is used to manage chunks and storage positions of the chunks based on hash values uniquely identifying the chunks. At least some of the information may be synchronized between the management information 4000A and the management information 4000B.

FIG. 4 illustrates an example of a configuration of the LDEV management table included in the management information stored in the storage device according to the embodiment.

The LDEV management table 4100 includes an entry (record) for each of LDEVs "PVOL", "SVOL", and the like. Information stored in each of the entries is an LDEV number 4101, an LDEV capacity 4102, a VOL type 4103, data compression validity 4105, deduplication validity 4106, a pool number 4104, a PG number 4107, and a data migration target 4108.

The LDEV number 4101 represents an identification number of a concerned LDEV. The LDEV capacity 4102 represents the capacity of the concerned LDEV. The VOL type 4103 represents the type (for example, "RVOL", "TPVOL", "SVOL" for snapshot, or the like) of the concerned LDEV. The data compression validity 4105 represents an attribute indicating whether data compression is valid for the concerned LDEV. The deduplication validity 4106 represents an attribute indicating whether deduplication is valid for the concerned LDEV.

The pool number 4104 represents an identification number of a pool associated with an LDEV that is, for example, "EVOL", "TPVOL", or "SVOL" and has a logical capacity. A data storage region is allocated from a region within the pool associated with the pool number 4104. On the other hand, for example, since an LDEV that is an "RVOL" or the like and has a physical capacity is not associated with a pool, "N/A" is indicated for the LDEV.

The PG number 4107 represents an identification number of a parity group (PG) associated with an LDEV that is, for example, an "RVOL" or the like and has a physical capacity. On the other hand, for example, since a PG that is directly associated with an LDEV that is a "TPVOL" or an "SVOL" and has a logical capacity is not present, "N/A" is indicated for the LDEV.

The data transition target 4108 represents an attribute to be used to select an LDEV targeted for data migration. For example, "applicable" is indicated for an LDEV targeted for data migration, while "not applicable" is indicated for an LDEV that is not targeted for data migration.

FIG. 5 illustrates an example of a configuration of the pool management table included in the management information stored in the storage device according to the embodiment.

The pool management table 4200 includes an entry for each of pools. Information stored in each of the entries is a pool number 4104, a pool capacity 4201, a pool allocation capacity 4202, a pool usage capacity 4203, and pool VOL information 4204. The pool number 4104 represents an identification number of a pool.

The pool capacity 4201 represents a defined capacity of the pool. Specifically, the pool capacity 4201 represents the total of one or more VOL capacities associated with one or more pool VOLs forming the pool. The pool allocation capacity 4202 represents a real capacity allocated to one or more LDEVs 200. Specifically, the pool allocation capacity 4202 represents a capacity of an entire page group allocated to one or more LDEVs 200.

The pool usage capacity 4203 represents a total amount of data stored in the pool. When data reduction (either one or both of compression and deduplication) is executed on data, the MPPKs 2111 may calculate the pool usage capacity 4203 based on the amount of the data after the data reduction. In the case where the drives 2107 compress the data, the MPPKs 2111 may calculate the pool usage capacity 4203 based on the amount of the data before the compression or may receive a notification indicating the amount of the data after the compression from the drives 2107 and calculate the pool usage capacity 4203 based on the amount of the data after the compression. The pool VOL information 4204 represents an LDEV number 4101 associated with an LDEV 200 that provides a substantial data storage region to the pool.

Figure 6:
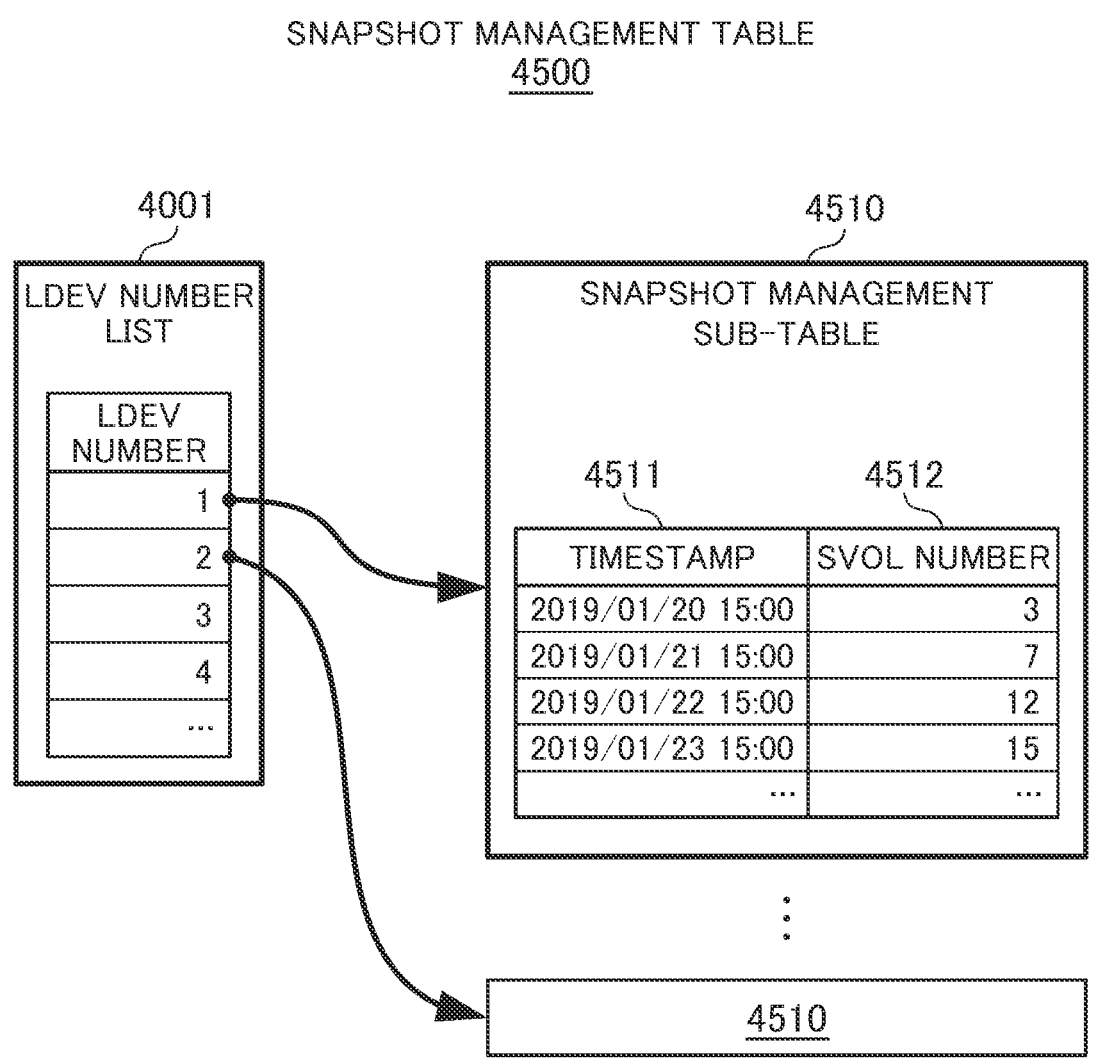
FIG. 6 is a diagram illustrating an example of a configuration of a snapshot management table included in the management information stored in the storage device.

FIG. 6 illustrates an example of a configuration of the snapshot management table included in the management information stored in the storage device according to the embodiment.

The snapshot management table 4500 includes a list 4001 of LDEV numbers 4101 and a snapshot management sub-table 4510 to be used to manage snapshot data for each of the LDEV numbers 4101.

The snapshot management sub-table 4510 includes an entry for each of timestamps 4511 or includes management information of snapshots for a target LDEV 200. The snapshot management sub-table 4510 stores, as SVOL numbers 4512, LDEV numbers of LDEVs storing the snapshot information.

Figure 7:
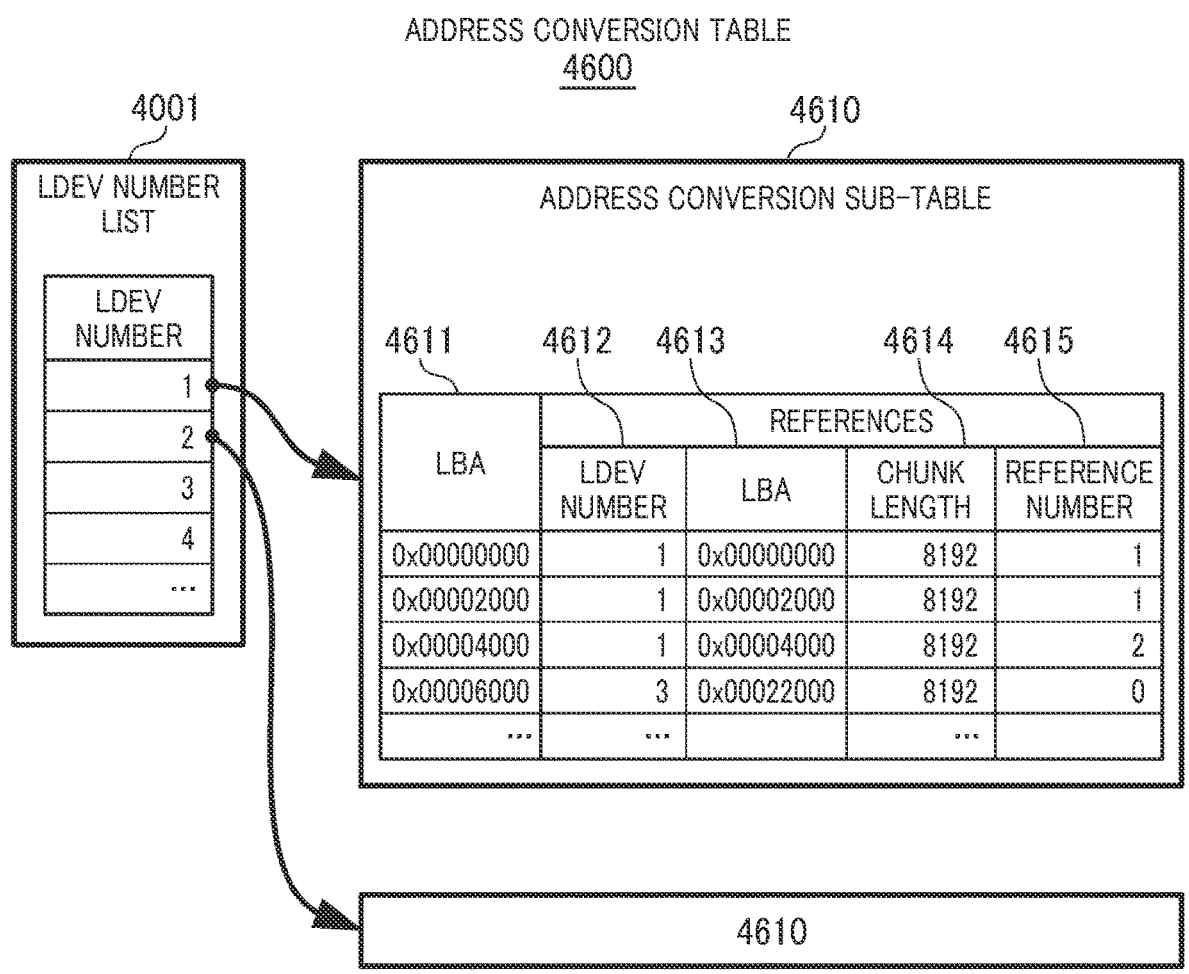
FIG. 7 is a diagram illustrating an example of a configuration of an address conversion table included in the management information stored in the storage device.

FIG. 7 illustrates an example of a configuration of the address conversion table included in the management information stored in the storage device according to the embodiment.

The address conversion table 4600 includes the list 4001 of the LDEV numbers 4101 and an address conversion sub-table 4610 to be used to manage a storage position of a chunk associated with each of logical addresses (LBAs) 4611 for each of the LDEV numbers 4101.

The address conversion sub-table 4610 includes an entry for each of the logical addresses (LBAs 4611) of the target LDEV 200. Information stored in each of the entries is an LBA 4611, a reference LDEV number 4612, a reference LBA 4613, a reference chunk length 4613, and a reference number 4615.

The LBA 4611 represents a logical address range of an LDEV 200 having a concerned LDEV number 4101. The reference LDEV number 4612, the reference LBA 4613, the reference chunk length 4614, and the reference number 4615 are information on a chunk associated with the logical address range of the LBA 4611. The reference LDEV number 4612 represents an identification number of the LDEV 200 storing the chunk. For example, when the LDEV number 4101 matches the reference LDEV number 4612, it means that the concerned chunk is stored in the concerned LDEV 200. When the LDEV number 4101 is different from the reference LDEV number 4612, it means that a chunk stored in another LDEV 200 is referenced.

The reference LBA 4613 represents a logical address of the LDEV 200 at which the chunk is stored. The reference chunk length 4614 represents the length of the chunk. The reference number 4615 represents the number of addresses from which the chunk is referenced. For example, when the reference number 4615 indicates 1, the chunk is not referenced from an address other than the LBA 4611. When the reference number 4615 indicates a value larger than 1, the chunk is referenced from one or more logical addresses. When the reference number 4615 indicates 0, the chunk is not referenced and a region in which the chunk is stored can be released.

FIG. 8 illustrates an example of a configuration of the chunk management table included in the management information stored in the storage device according to the embodiment.

The chunk management table 4700 includes an entry for each of individual chunks, and information stored in each of the entries is a hash value 4701, an LDEV number 4101, an LBA 4611, and a data length 4702.

The hash value 4701 is an identification sign uniquely identifying the individual chunk. For example, the hash value 4701 is a data stream obtained by a hash function that is a secure hash algorithm (SHA) or the like and to which a data stream of the chunk has been input. Alternatively, the has value 4701 is a partial data stream of the obtained data stream.

The LDEV number 4101 is an identification number of an LDEV in which the chunk is stored. The LBA 4611 is a logical address indicating a storage position of the chunk in the LDEV in which the chunk is stored. The data length 4702 is a data length of the chunk on the LDEV in which the chunk is stored.

FIG. 9 illustrates an example of a configuration of the LDEV configuration information according to the embodiment.

The LDEV configuration information 3101 is a table for storing LDEV information targeted for migration of data from the migration source storage to the migration destination storage and is composed of an LDEV list 4703 of LDEVs targeted for the migration and an LDEV configuration information sub-table 4704 for storing configuration information of the LDEVs.

The LDEV list 4703 includes an entry for each of the LDEVs targeted for the data migration, and information stored in each of the entries is an LDEV number 4101, an LDEV capacity 4102, a VOL type 4103, data compression validity 4105, deduplication validity 4106, and snapshot validity 4705.

The LDEV number 4101 represents an identification number of an LDEV targeted for data migration. The LDEV capacity 4102 represents the capacity of the LDEV targeted for the data migration. The VOL type 4103 represents the type of the LDEV targeted for the data migration. The data compression validity 4105 represents whether data compression is valid or invalid for the LDEV targeted for the data migration. The deduplication validity 4106 represents whether data deduplication is valid or invalid for the LDEV targeted for the data migration. The snapshot validity 4705 represents whether snapshot is valid or invalid for the LDEV targeted for the data migration. The snapshot validity 4705 represents whether an SVOL that is a storage destination of snapshot data of the LDEV is present.

The LDEV configuration information sub-table 4704 is a table for storing information for each logical address (chunk unit) for data stored in each LDEV targeted for the migration, and information stored in each of entries of the LDEV configuration information sub-table 4704 is an LBA 4611, a reference LDEV number 4612, a reference LBA 4613, a reference chunk length 4614, and a hash value 4701.

The LBA 4611 represents a logical address in the concerned LDEV. The reference LDEV number 4612 represents an LDEV number of the LDEV in which a chunk to be referenced from the LBA indicated in the concerned entry is stored. For example, when the LDEV number 4101 of the concerned LDEV in the LDEV list matches the reference LDEV number 4612, it means that chunk data of the concerned entry is stored in the LDEV. When the LDEV number 4101 does not match the reference LDEV number 4612, it means that chunk data stored in another LDEV is referenced. The reference LBA 4613 represents a logical address of the LDEV at which the chunk to be referenced from the LBA indicated in the concerned entry is stored. The reference chunk length 4614 represents a data length of the chunk to be referenced from the LBA indicated in the concerned entry. The hash value 4701 represents a hash value identifying the chunk data to be referenced from the LBA indicated in the concerned entry.

Data Migration in Migration Source Storage Device

Figure 10:
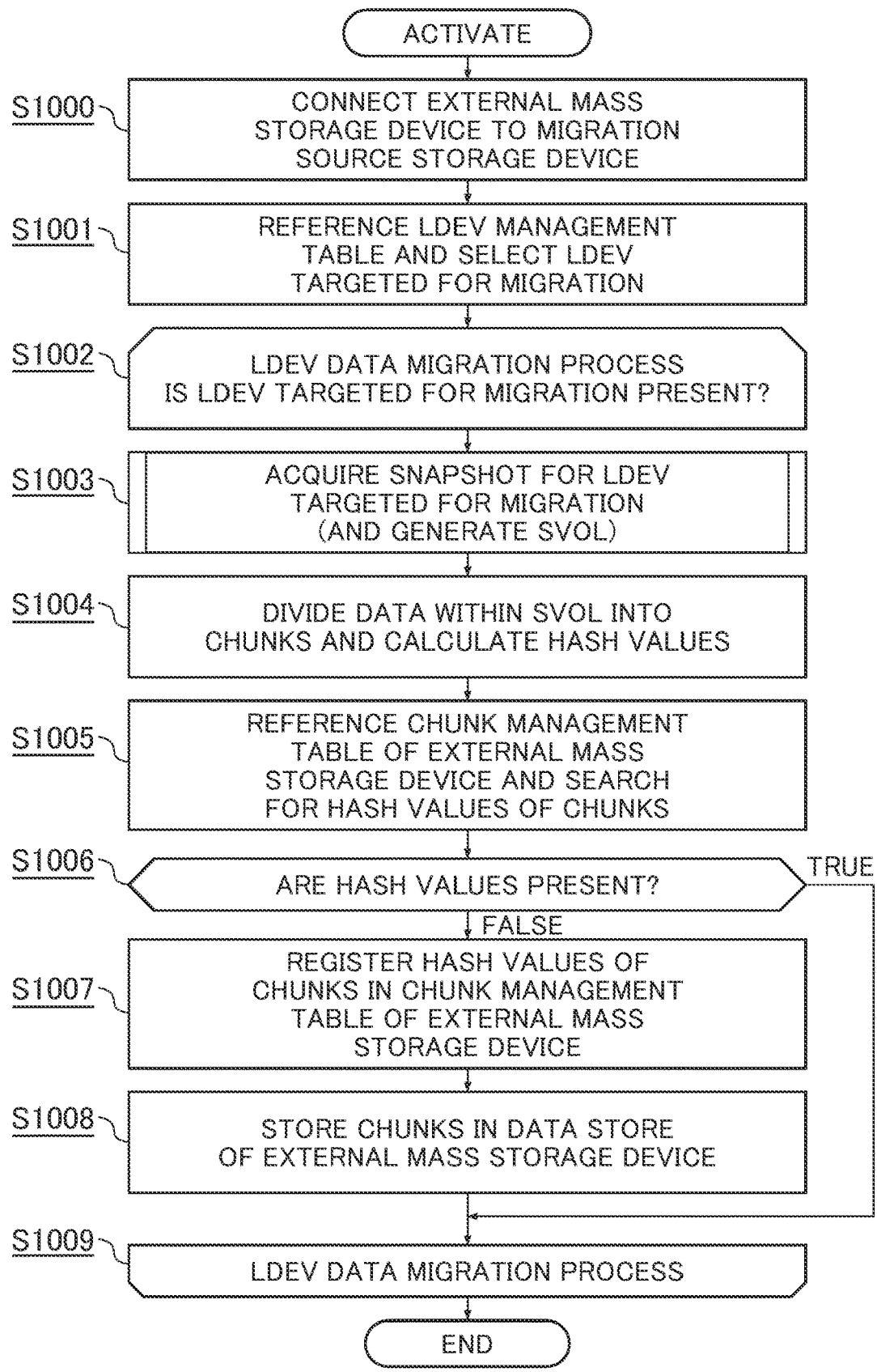
FIG. 10 is a diagram illustrating a process flow of a data migration process by migration source storage.

FIG. 10 illustrates an example of a data migration process in the migration source storage according to the embodiment.

In step S1000, the external mass storage device 3000 is connected to the migration source storage device. In step S1001, the data migration program 6001 references the LDEV management table 4100 of the migration source storage and references information of an LDEV for which the data migration target 4108 indicates "applicable".

In steps S1002 to S1009, the data migration process is executed on each of LDEVs targeted for migration. In step S1003, to acquire a static data image of the LDEV, a snapshot is acquired and an SVOL storing a snapshot image is generated.

In step S1004, the data compression/deduplication program 6003 divides data of the SVOL storing the snapshot image acquired in step S1003 into chunks and calculates a hash value for each of the chunks.

In step S1005, the chunk management table 4700 within the external mass storage device 300 is referenced. In step S1006, it is determined whether the hash values of the chunks that have been calculated in step S1004 are already registered in the chunk management table 4700.

When the hash values are not registered in the chunk management table 4700 in step S1006, the hash values of the chunks are registered in the chunk management table 4700 within the external mass storage device 3000 in step S1007. In step S1008, the data of the chunks is stored in the data store 3100 within the external mass storage device 3000.

When the hash values are already registered in the chunk management table 4700 in step S1006, it is determined that the chunk data is already stored in the external mass storage device 3000, and the process proceeds to step S1009. In step S1009, it is determined whether an LDEV targeted for the migration and not yet processed is present. When the LDEV targeted for the migration and not yet processed is present in step S1009, the process returns to step S1001.

When the LDEV targeted for the migration and not yet processed is not present in step S1009, the process is terminated.

Data Migration in Migration Destination Storage Device

Figure 11:
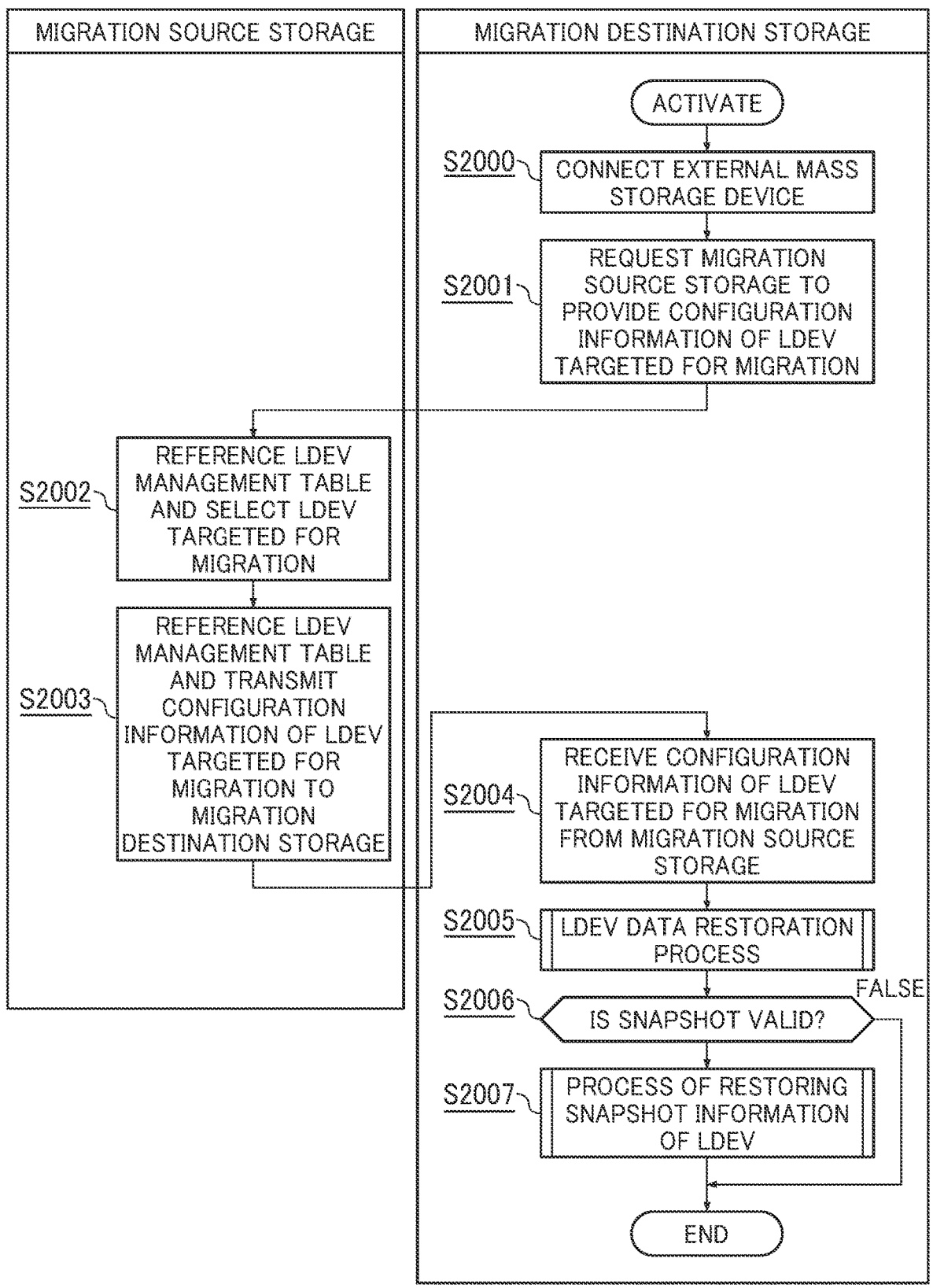
FIG. 11 is a diagram illustrating a process flow of a data migration process by migration destination storage.

FIG. 11 illustrates an example of a data migration process in the migration destination storage according to the embodiment.

In step S2000, the external mass storage device 3000 is connected to the migration destination storage device. In step S2001, the migration destination storage device activates the data migration restoration program 6002 and requests the migration source storage device to provide the configuration information 3101 of an LDEV targeted for data migration.

In step S2002, in the migration source storage, the data migration program 6001 references the LDEV management table 4100 and references information of the LDEV for which the data migration target 4108 indicates "applicable".

In step S2003, in the migration source storage, the data migration program 6001 references the LDEV management table 4100, generates the LDEV configuration information 3101 for the LDEV for which the data migration target 4108 indicates "applicable", and uses the inter-DC data line 103 to transmit the LDEV configuration information 3101 to the migration destination storage.

In step S2004, the migration destination storage receives the LDEV configuration information 3101 transmitted from the migration source storage. In step S2005, in the migration destination storage, the data migration restoration program 6002 executes a process of restoring the LDEV based on the LDEV configuration information 3101.

In step S2006, it is determined whether snapshot is valid or invalid based on the snapshot validity 4705 of the LDEV configuration information 3101 for the LDEV targeted for the data restoration process. When the snapshot is valid in step S2006, a process of restoring snapshot information of the LDEV is executed in step S2007. When the snapshot is invalid, the process is terminated.

LDEV Data Restoration Process in Migration Destination Storage Device

Figure 12:
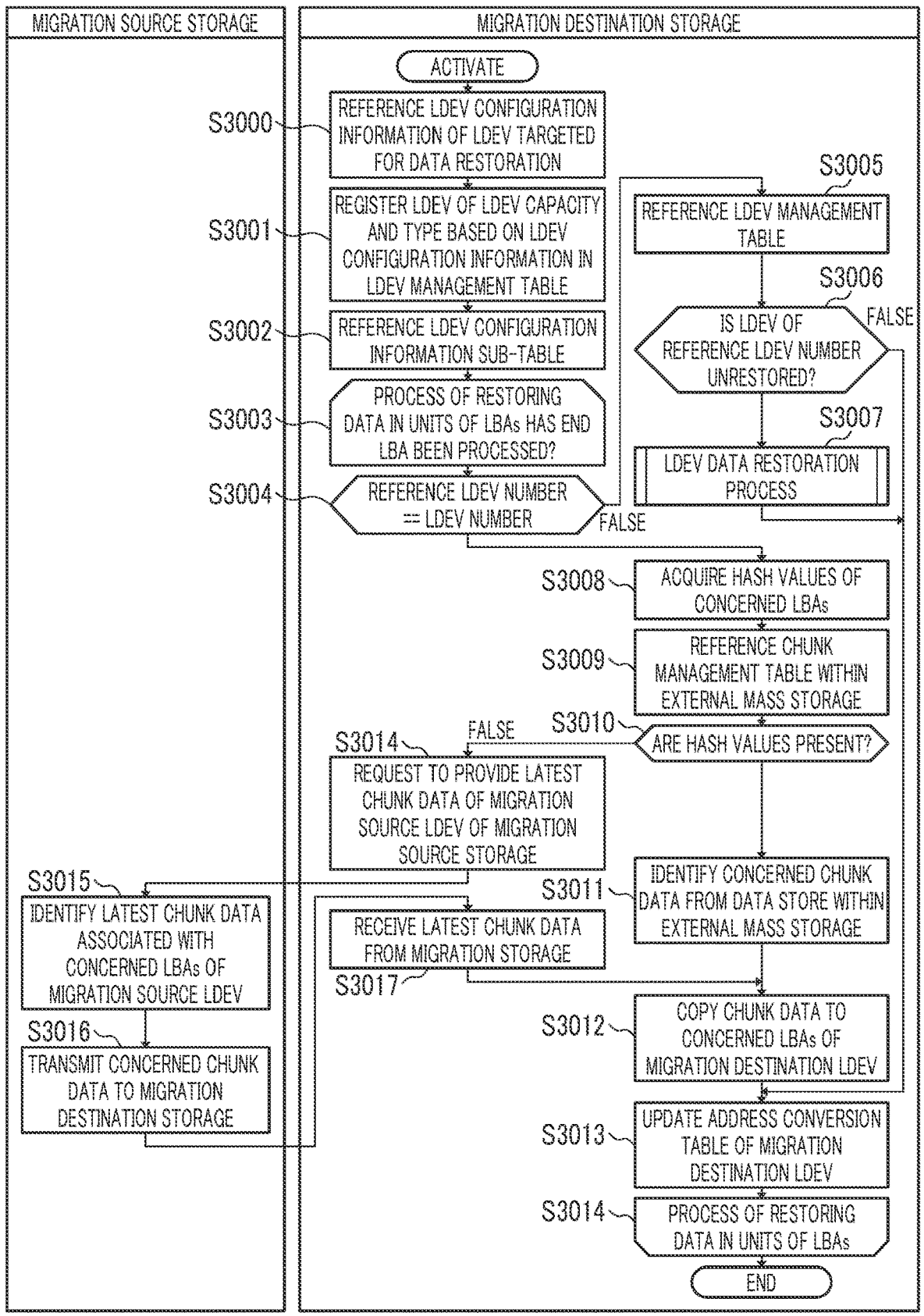
FIG. 12 is a diagram illustrating a process flow of an LDEV data restoration process by a data migration restoration program of a migration destination storage device.

FIG. 12 illustrates an example of an LDEV data restoration process to be executed by the data migration restoration program 6002 of the migration destination storage device according to the embodiment.

In step S3000, the LDEV configuration information 3101 targeted for the process is referenced.

In step S3001, an LDEV targeted for the migration and having the same attribute as that of a migration source LDEV is registered in the LDEV management table 4100 of the migration destination storage device based on the LDEV configuration information 3101.

In step S3002, the LDEV configuration information sub-table 4704 is referenced and information on a chunk for each of LBAs 4611 of the LDEV targeted for the data migration is acquired. In steps S3003 to S3014, a range from the start LBA 4611 among the LBAs 4611 of the LDEV targeted for the data restoration to the end LBA 4611 among the LBAs 4611 is processed.

In step S3004, the LDEV configuration information table 4704 is referenced and it is determined whether the reference LDEV number 4612 matches the LDEV number 4101 targeted for the process. When the reference LDEV number 4612 matches the LDEV number 4101, it means that chunks associated with the LBAs 4611 are data stored in the LDEV having the LDEV number 4101 targeted for the process. When the reference LDEV number 4612 does not match the LDEV number 4101, a volume other than the LDEV targeted for the process is referenced for the chunks associated with the LBAs 4611. To check whether the LDEV having the LDEV number 4101 to be referenced is already restored, the LDEV management table 4100 is referenced and the presence of the LDEV is checked in step S3005.

When the concerned LDEV is not yet restored in step S3005, the LDEV with the LDEV number 4101 to be referenced is restored by executing the data restoration process on the concerned LDEV in step S3007. When the concerned LDEV is already restored in the step S3006, the chunks associated with the concerned LBAs 4611 of the LDEV with the LDEV number 4101 to be referenced are already restored. Therefore, in step S3013, address information associated with the concerned LBAs 4611 is updated in the address conversion table 4600 associated with the concerned migration destination LDEV.

In step S3008, hash values 4701 in the LDEV configuration information sub-table 4704 are referenced, because the chunks associated with the concerned LBAs 4611 are chunk data restored in the LDEV targeted for the process.

In step S3009, the chunk management table 4700 within the external mass storage device 3000 is referenced. In step S3010, it is determined whether the concerned hash values 4701 are already registered. When the concerned hash values 4701 are already registered, the concerned chunk data is identified from the data store 3100 within the external mass storage device 3000 in step S3011 and is copied to the concerned LBAs of the migration destination LDEV in step S3012.

When the concerned hash values 4701 are not registered in step S3010, the latest chunk data of the migration source LDEV in the migration source storage is requested in step S3014. In step S3015, the data migration program 6001 of the migration source storage device identifies the latest chunk data associated with the concerned LBAs of the migration source LDEV. In step S3016, the concerned chunk data is transmitted to the migration destination storage device via the inter-DC data line 103 and the like.

In step S3017, the data migration restoration program 6002 of the migration destination storage device receives the latest chunk data from the migration source storage. In step S3012, the chunk data is copied to and stored at the concerned LBAs of the migration destination LDEV. In step S3013, the address conversion table 4600 associated with the LDEV is updated. When the process is completely executed on the LBAs up to the end LBA of the LDEV in step S3014, the data restoration process is terminated.

LDEV Snapshot Restoration Process in Migration Destination Storage Device

Figure 13:
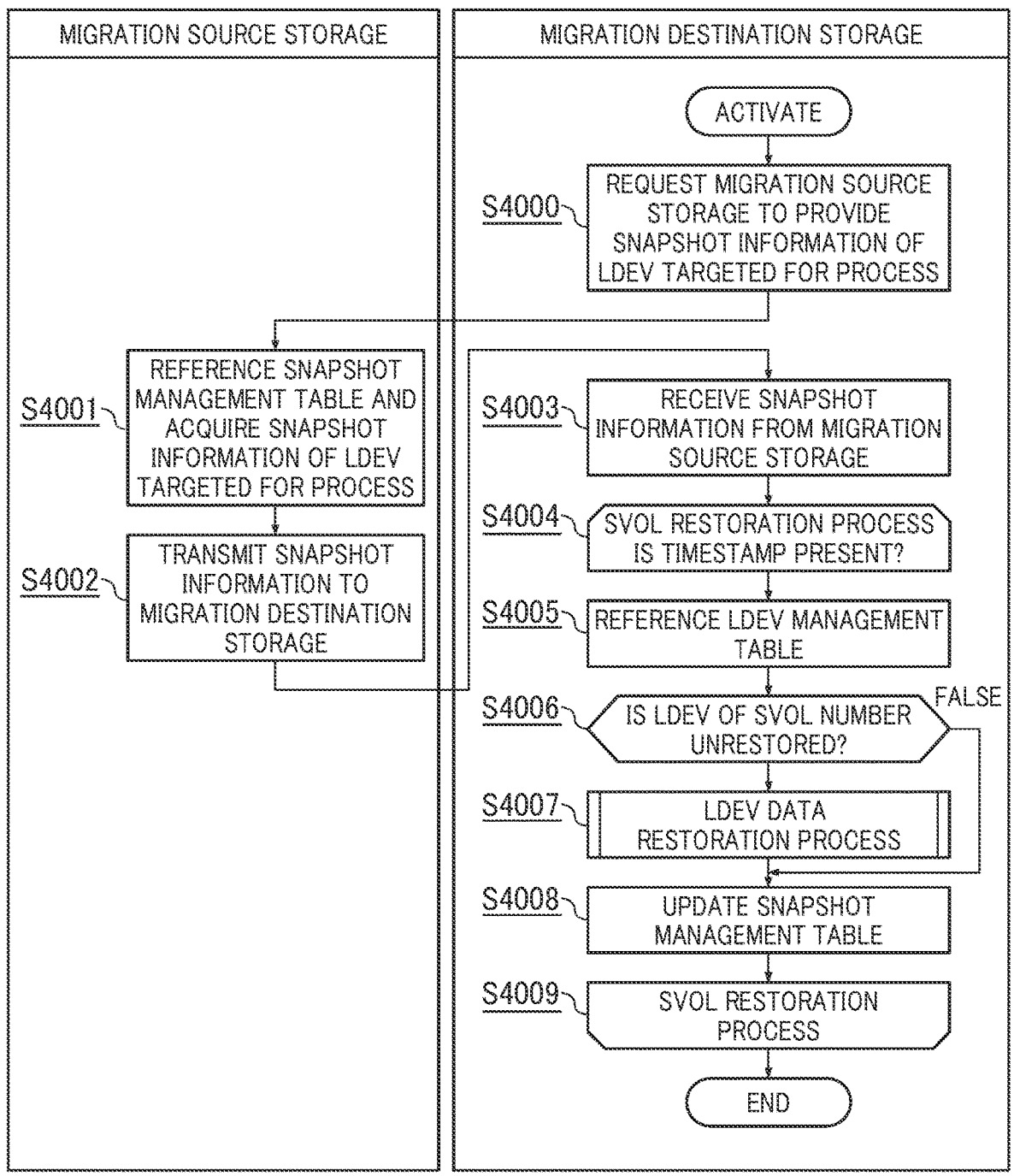
FIG. 13 is a diagram illustrating a process flow of an LDEV snapshot restoration process by the data migration restoration program of the migration destination storage device.

FIG. 13 illustrates an example of an LDEV snapshot restoration process by the data migration restoration program 6002 of the migration destination storage device that uses the data migration method according to the embodiment.

In step S4000, the data migration restoration program 6002 of the migration destination storage requests the migration source storage to provide snapshot information of an LDEV targeted for the process. In step S4001, the data migration program 6001 of the migration source storage references the snapshot management table 4500 and acquires the snapshot information of the LDEV targeted for the process.

In step S4002, the snapshot information is transmitted to the migration destination storage. In step S4003, the migration destination storage receives the snapshot information of the LDEV targeted for the process.

In step S4004, it is checked whether an SVOL with an SVOL number 4512 associated with each of timestamps 4511 when snapshots have been acquired is already restored in the migration destination storage device. Therefore, in step S4005, the LDEV management table 4100 is referenced in the migration destination storage device. In step S4006, it is determined whether the LDEV with the concerned SVOL number is already restored.

When the LDEV with the SVOL number is not restored in step S4006, the LDEV data restoration process is executed to restore the SVOL in step S4007. When the LDEV with the SVOL number is already restored in step S4006, the SVOL storing snapshot data is already restored. Therefore, in step S4008, the snapshot management table 4500 associated with the concerned LDEV in the migration destination storage device is updated. When the SVOLs associated with all the timestamps 4511 are already restored for the LDEV targeted for the process in step S4009, the process is terminated.

What is claimed is:

1. A storage device connected via a data line to a migration source storage device that stores migration target data, wherein a transportable external mass storage device that stores the migration target data migrated from the migration source storage device is connected to the storage device, the storage device references logical configuration information received from the migration source storage device via the data line and restores and stores the migration target data stored in the external mass storage device, the migration source storage device divides the migration target data stored in the external mass storage device into a plurality of data blocks that do not overlap each other, and a set of the divided data blocks and identification signs associated with the data blocks are stored in the external mass storage device, the identification signs are transmitted to the storage device via the data line, and the storage device identifies the data blocks associated with the identification signs from the set of data blocks stored in the external mass storage device, references the logical configuration information, and restores and stores the identified data blocks.

2. The storage device according to claim 1, wherein the identification signs are hash values into which the data blocks are converted.

3. The storage device according to claim 1, wherein after the migration target data is stored in the external mass storage device, data is able to be input to and output from the migration target data within the migration source storage device, and the storage device requests, via the data line, the migration source storage device to provide data for shortage corresponding to a difference between the logical configuration information and the migration target data and acquires the data from the migration source storage device in the restoration of the migration target data.

4. The storage device according to claim 3, wherein the logical configuration information is transmitted in response to the request from the storage device to the migration source storage device after the storage device is connected to the external mass storage device storing the migration target data.

5. The storage device according to claim 1, wherein the migration source storage device transmits snapshot information to the storage device via the data line in order to restore a snapshot formed by acquiring a static data image of the migration source storage device at certain time, and the storage device references the snapshot information received via the data line and restores and stores the migration target data stored in the external mass storage device.

6. A data migration method for migrating migration target data stored in a first storage device installed in a migration source data center to a second storage device installed in a migration destination data center, wherein the first storage device of the migration source data center is connected to the second storage device of the migration destination data center via a data line, a transportable external mass storage device is connected to the first storage device and stores the migration target data, logical configuration information relating to the migration target data is transmitted from the first storage device to the second storage device via the data line, the second storage device is connected to the external mass storage device storing the migration target data and references the logical configuration information received via the data line, and the migration target data stored in the external mass storage device is restored in the second storage device, the first storage device divides the migration target data into a plurality of data blocks that do not overlap each other, and causes a set of the divided data blocks and identification signs associated with the data blocks to be stored in the external mass storage device, the identification signs are transmitted from the first storage device to the second storage device via the data line, and the first storage device identifies the data blocks associated with the identification signs from the set of data blocks stored in the external mass storage device and references the logical configuration information, and the identified data blocks are restored in the second storage device.

7. The data migration method according to claim 6, wherein the identification signs are hash values into which the data blocks are converted.

8. The data migration method according to claim 6, wherein after the first storage device causes the migration target data to be stored in the external mass storage device, data is able to be input to and output from the migration target data within the first storage device, the second storage device requests, via the data line, the first storage device to provide data for shortage corresponding to a difference between the logical configuration information and the migration target data in the restoration of the migration target data, and the first storage device transmits the requested data to the second storage device via the data line.

9. The data migration method according to claim 8, wherein the logical configuration information is transmitted in response to the request from the second storage device to the first storage device after the second storage device is connected to the external mass storage device storing the migration target data.

10. The data migration method according to claim 6, wherein the first storage device transmits snapshot information to the second storage device via the data line in order to restore a snapshot formed by acquiring a static data image of the migration source storage device at certain time, and the second storage device references the snapshot information received via the data line, and the migration target data stored in the external mass storage device is restored in the second storage device.

11. A storage device connected via a data line to a migration source storage device that stores migration target data, wherein a transportable external mass storage device that stores the migration target data migrated from the migration source storage device is connected to the storage device, the storage device references logical configuration information received from the migration source storage device via the data line and restores and stores the migration target data stored in the external mass storage device, after the migration target data is stored in the external mass storage device, data is able to be input to and output from the migration target data within the migration source storage device, and the storage device requests, via the data line, the migration source storage device to provide data for shortage corresponding to a difference between the logical configuration information and the migration target data and acquires the data from the migration source storage device in the restoration of the migration target data.

12. The storage device according to claim 11, wherein the logical configuration information is transmitted in response to the request from the storage device to the migration source storage device after the storage device is connected to the external mass storage device storing the migration target data.

13. A storage device connected via a data line to a migration source storage device that stores migration target data, wherein a transportable external mass storage device that stores the migration target data migrated from the migration source storage device is connected to the storage device, the storage device references logical configuration information received from the migration source storage device via the data line and restores and stores the migration target data stored in the external mass storage device, the migration source storage device transmits snapshot information to the storage device via the data line in order to restore a snapshot formed by acquiring a static data image of the migration source storage device at certain time, and the storage device references the snapshot information received via the data line and restores and stores the migration target data stored in the external mass storage device.

* * * * *